(12) United States Patent
Kim et al.

(10) Patent No.: US 11,599,981 B2
(45) Date of Patent: Mar. 7, 2023

(54) IMAGE PROCESSING SYSTEM

(71) Applicant: SK hynix Inc., Gyeonggi-do (KR)

(72) Inventors: Tae Hyun Kim, Gyeonggi-do (KR); Jin Su Kim, Gyeonggi-do (KR); Jong Hyun Bae, Gyeonggi-do (KR); Sung Joo Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 216 days.

(21) Appl. No.: 17/065,241

(22) Filed: Oct. 7, 2020

(65) Prior Publication Data

US 2021/0125320 A1 Apr. 29, 2021

(30) Foreign Application Priority Data

Oct. 29, 2019 (KR) ........................ 10-2019-0135041

(51) Int. Cl.
*G06T 5/50* (2006.01)
*G06N 3/08* (2006.01)
(Continued)

(52) U.S. Cl.
CPC ............. *G06T 5/50* (2013.01); *G06N 3/0454* (2013.01); *G06N 3/08* (2013.01); *G06N 20/20* (2019.01);
(Continued)

(58) Field of Classification Search
CPC .... G06K 9/6273; G06N 20/20; G06N 3/0454; G06N 3/0472; G06N 3/08; G06N 3/088;
(Continued)

(56) References Cited

U.S. PATENT DOCUMENTS

2017/0185871 A1  6/2017  Zhang et al.
2018/0075581 A1  3/2018  Shi et al.
(Continued)

FOREIGN PATENT DOCUMENTS

KR         10-1791573         10/2017
KR     10-2018-0010950         1/2018
(Continued)

OTHER PUBLICATIONS

Huaxiao Mo, "Fake Faces Identification via Convolutional Neural Network,"Jun. 14, 2018, IH&MMSec '18: Proceedings of the 6th ACM Workshop on Information Hiding and Multimedia SecurityJun. 2018, pp. 43-46.*

(Continued)

*Primary Examiner* — Omar S Ismail
(74) *Attorney, Agent, or Firm* — IP & T Group LLP

(57) ABSTRACT

An image processing system includes: an image signal processor including a first neural network, and processing an input image by using the first neural network so as to generate a post-processed image; and a discriminator including a second neural network, and receiving a target image and the post-processed image, and discriminating the target image and the post-processed image into a real image and a fake image by using the second neural network, wherein the second neural network is trained to discriminate the target image as a real image and to discriminate the post-processed image as a fake image, and the first neural network is trained in such a manner that the post-processed image is discriminated as a real image by the second neural network.

8 Claims, 3 Drawing Sheets

(51) Int. Cl.
*G06N 20/20* (2019.01)
*G06N 3/04* (2006.01)

(52) U.S. Cl.
CPC .............. *G06T 2207/20081* (2013.01); *G06T 2207/20084* (2013.01)

(58) Field of Classification Search
CPC ............ G06T 1/20; G06T 2207/20081; G06T 2207/20084; G06T 5/001; G06T 5/50; G06V 10/82
See application file for complete search history.

(56) References Cited

U.S. PATENT DOCUMENTS

| | | | |
|---|---|---|---|
| 2019/0058844 A1 | 2/2019 | Sato | |
| 2019/0065853 A1* | 2/2019 | Sohn | G06V 10/82 |
| 2019/0065862 A1 | 2/2019 | Silberschatz et al. | |
| 2019/0096056 A1* | 3/2019 | Giering | G06V 10/82 |
| 2019/0122072 A1* | 4/2019 | Cricrì | G06V 10/764 |
| 2019/0130292 A1* | 5/2019 | N | G06N 5/047 |
| 2019/0208181 A1* | 7/2019 | Rowell | H04N 9/8227 |
| 2019/0251721 A1* | 8/2019 | Hua | G06N 3/08 |
| 2019/0286950 A1* | 9/2019 | Kiapour | G06K 9/627 |
| 2019/0295302 A1* | 9/2019 | Fu | G06N 3/088 |
| 2019/0297326 A1* | 9/2019 | Reda | G06N 20/10 |
| 2020/0110930 A1* | 4/2020 | Simantov | G06V 30/412 |
| 2020/0294287 A1* | 9/2020 | Schlemper | G01R 33/36 |
| 2021/0073584 A1* | 3/2021 | St. Romain, II | G06T 19/003 |

FOREIGN PATENT DOCUMENTS

| | | | | |
|---|---|---|---|---|
| KR | 10-2018-0105556 | | 9/2018 | |
| WO | WO-2019218621 A1 * | | 11/2019 | G06K 9/00248 |

OTHER PUBLICATIONS

Huy H. Nguyen, "Modular Convolutional Neural Network for Discriminating between Computer-Generated Images and Photographic Images," Aug. 27, 2018, ARES 2018: Proceedings of the 13th International Conference on Availability, Reliability an.*

Diamond et al., Dirty Pixels: Optimizing Image Classification Architectures for Raw Sensor Data, aparXiv: 1701.06487v1 [cs.CV], Jan. 2017, pp. 1-11.

* cited by examiner

IMAGE PROCESSING SYSTEM

CROSS-REFERENCE TO RELATED APPLICATION

The present application claims priority of Korean Patent Application No. 10-2019-0135041, filed on Oct. 29, 2019, which is incorporated herein by reference in its entirety.

BACKGROUND

1. Field

Various embodiments of the present invention relate to an image processing system for processing images.

2. Description of the Related Art

FIG. 1 is a block diagram illustrating a typical image processing system.

In FIG. 1, an image sensor 110 generates an image, which may be processed by an image signal processor (ISP) 120. The image signal processor 120 may process images in such a manner that images that are aesthetically optimized for human eyes. The images processed by the image signal processor 120 may be provided for viewing through an imaging device 130, e.g., a monitor.

Recently, computer vision is being used as a field of artificial intelligence (AI). Computer vision analyzes images to detect, recognize, and segment objects, and predicts the location of the objects based on the analyzation result. Computer vision component(s) is/are provided with images processed by the image signal processor 120. Since the image signal processor 120 is typically specialized for aesthetic functions on the premise that the obtained images are to be seen by human eyes, the output of the image processor 120 is not appropriate for computer vision processing. Rather, the image processing of the image signal processor 120 may make it more difficult to analyze images using computer vision.

Therefore, it is required to develop an image signal processor which is capable of providing an output for computer vision processing.

SUMMARY

Embodiments of the present invention are directed to an image signal processor that is specialized for computer vision.

In accordance with an embodiment of the present invention, an image processing system includes: an image signal processor, including a first neural network, configured to process an input image using the first neural network to generate a post-processed image; and a discriminator, including a second neural network, configured to receive a target image and the post-processed image, and to discriminate between the target image and the post-processed image using the second neural network, wherein the second neural network is trained to recognize the target image as a real image and to recognize the post-processed image as a fake image, and the first neural network is trained in such a manner that the post-processed image is recognized as the real image by the second neural network.

In accordance with another embodiment of the present invention, an image processing system includes: an image sensor suitable for generating an input image; an image signal processor suitable for processing the input image for analysis by a computer vision component so as to generate a post-processed image; and the computer vision component suitable for analyzing the post-processed image.

In accordance with yet another embodiment of the present invention, a method for training an image processing system includes: generating, by a first neural network, a post-processed image by processing an input image; discriminating, by a second neural network, a target image and the post-processed image to recognize the target image as a real image and to recognize the post-processed image as a fake image to produce a discrimination result; and training the first neural network or the second neural network in response to the discrimination result.

In accordance with yet another embodiment of the present invention, a system includes: an image sensor suitable for generating an input image; an image signal processor suitable for processing the input image to generate a post-processed image; a computer vision component suitable for analyzing the post-processed image; a target image generator suitable for receiving the input image and updating the input image to generate a target image such that a loss value is decreased, the loss value obtained when the computer vision component analyzes the input image; and a discriminator suitable for receiving the target image and the post-processed image, and which recognizes the target image as a real image and recognizes the post-processed image as a fake image.

DETAILED DESCRIPTION

Figure 1:
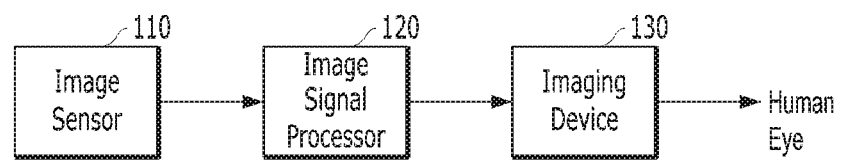
FIG. 1 is a block diagram illustrating a typical image processing system.

Various embodiments of the present invention will be described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 2:
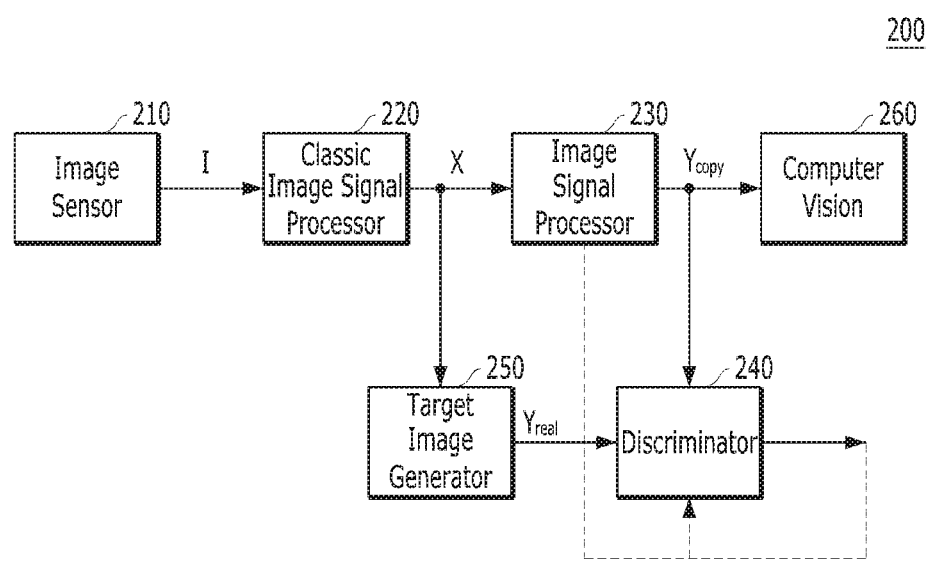
FIG. 2 is a block diagram illustrating an image processing system in accordance with an embodiment of the present invention.

FIG. 2 is a block diagram illustrating an image processing system 200 in accordance with an embodiment of the present invention.

Referring to FIG. 2, the image processing system 200 may include an image sensor 210, a classic image signal processor 220, an image signal processor 230, a discriminator 240, a target image generator 250, and one or more components for performing computer vision processing (computer vision) 260.

The image sensor 210 may generate an image I by transforming light received through a lens (not shown) into digital signals.

The classic image signal processor 220 may process the image I generated by the image sensor 210. The classic image signal processor 220 may process the image I to generate an image that is aesthetically optimized for viewing by human eyes. Herein, the term 'classic' is added because the classic image signal processor 220 is an image signal processor that performs the same function as the typical image signal processor for aesthetically processing the image I. Since the classic image signal processor 220 is for aesthetic processing, it may not be necessary for the computer vision 260. Therefore, the classic image signal processor 220 may be omitted from the image processing system 200.

The image signal processor 230 may process an image X (or image I if the classic image processor 220 is omitted) to be analyzed in detail by the computer vision 260 so as to generate a post-processed image Ycopy. The image signal processor 230 may generate a post-processed image to enable detailed analysis by the computer vision 260, rather than generating an image that is simply aesthetically pleasing to human eyes. For example, when the computer vision 260 detects an object, image processing may be performed in such a manner that objects in the image Ycopy are better detected by the computer vision 260 than in the image X. When the computer vision 260 recognizes an object, image processing may be performed in such a manner that objects in the image Ycopy are better recognized by the computer vision 260 than in the image X. The image signal processor 230 may be formed to include a neural network, which may be trained, or learn, to perform image processing to generate an image on which the computer vision 260 is able to perform detailed processing.

The discriminator 240 and the target image generator 250 may be constituent elements for training (or learning) of the image signal processor 230. The discriminator 240 may be formed to include a neural network, and the discriminator 240 may train the neural network to discriminate between the image Ycopy generated by the image signal processor 230 and a target image Yreal generated by the target image generator 250. That is, the discriminator 240 is configured to recognize Ycopy as a fake image and recognize Yreal as a real image. The target image generator 250 may generate a target image Yreal corresponding to a target image to be generated by the image signal processor 230.

The computer vision 260 may receive an image processed by the image signal processor 230 and analyze the image. The computer vision may perform one or more analysis operations among various functions such as detection, recognition, segmentation, and prediction of location of objects.

The training operation of the image signal processor 230 using the image signal processor 230, the discriminator 240, and the target image generator 250 are described in detail below.

The target image generator 250 may generate a target image Yreal, which is a correct answer image to be generated by the image signal processor 230. In other words, the image signal processor 230 generates the image Ycopy to be the same as the target image Yreal as much as possible. The target image generator 250 may generate the target image Yreal by using a fast gradient sign method. In deep learning-based computer vision, there is a loss value representing how much different the result of a test using an input image is from the actual correct answer. Therefore, when the image X is inputted to the computer vision 260, a loss value representing how much different the result of processing the image X is from the correct answer may be obtained from the computer vision 260, and when the image X is updated in a direction that the loss value decreases, which is the reverse direction of a gradient, the target image Yreal may be obtained. This may be represented as the following Equation 1.

$$X_{modify} = X - \varepsilon * \text{sign}(\nabla_x J(x, y_{true})) \quad \text{Equation 1}$$

Herein, X may represent an output image X of the classic image signal processor 220, and $y_{true}$ may represent the correct answer that is obtained when the image X is inputted to the computer vision 260. $\nabla_x J$ may represent a loss value that is set in the deep learning-based computer vision 260, and $\nabla_x J(x, y_{true})$ may represent how much different the correct answer $y_{true}$ is from a result x which is determined when an input X is inputted to the computer vision 260. $X - \varepsilon * \text{sign}(\nabla_x J(x, y_{true}))$ may represent that the loss values are obtained and the image X is updated in a direction that the loss values decrease, where $\varepsilon$ is a set value representing how much to update. A target image $y_{true}$ which is more appropriate for the computer vision than the image X generated by the classic image signal processor 220 may be generated by updating the X value based on the set value E.

Since the target image Yreal is required for the training of the image signal processor 230 and the discriminator 240, training operations of the image signal processor 230 and the discriminator 240 may be performed after the target image Yreal is generated.

The discriminator 240 may receive the target image Yreal and an output image Ycopy of the image signal processor 230 and discriminate between Yreal and Ycopy, i.e., between a real image and a fake image. The discriminator 240 may be trained to recognize the target image Yreal as a real image and recognize the image Ycopy as a fake image.

To be specific, the discriminator 240 may be trained by solving the following Equation 2.

$$\max_{D} V(D) = E_{z \sim pdata(x)}[\log(D(x))] + E_{z \sim p_z(z)}[\log(1 - D(G(z)))] \quad \text{Equation 2}$$

Here, D(x) may represent a model of the discriminator 240. When the corresponding image is determined to be a real image, D(x)=1, and when the corresponding image is determined to be a fake image, D(x)=0. In Equation 2, the D(x) portion may represent the discrimination result for the target image Yreal, and the D(G(z)) portion may represent the discrimination result for the output image Ycopy of the image signal processor 230. X~Pdata(x) may represent data sampled from the probability distribution for the target image Yreal, and Z~Pz(z) may represent data sampled from arbitrary noise generally using a Gaussian distribution. Since the discriminator 240 has to be trained to recognize the target image Yreal as a real image and to recognize the image Ycopy as a fake image, i.e., discriminate between the two, Equation 2 may have to be trained to be log(1)+log(1−0). This means that the training is performed in such a manner that Equation 2 is maximized after all.

The image signal processor 230 may be trained to generate the image Ycopy to be as close as possible to the target image Yreal. In other words, the image signal processor 230 may be trained to generate the image Ycopy to be recognized by the discriminator 240 as a real image Yreal. To be specific, the image signal processor 230 may be trained by the method of solving Equation 3 below.

$$\min_G V(G) = E_{z \sim p_z(z)}[\log(1 - D(G(z)))] \quad \text{Equation 3}$$

As described above, the D(G(z)) portion may represent the discrimination result of the discriminator 240 with respect to the output image Ycopy of the image signal processor 230. Since the image signal processor 230 has to be trained in such a manner that the image Ycopy may be recognized as a real image by the discriminator 240, the training may have to be performed such that log (1−D(G(z)))=log(1−1)=log(0). In other words, the image signal processor 230 may be trained in such a manner that Equation 3 is minimized.

The discriminator 240 and the image signal processor 230 may perform training operations that are essentially opposed to each other. This is because the discriminator 240 is trained to recognize the image Ycopy processed by the image signal processor 230 as a fake image and the image signal processor 230 is trained to cheat the discriminator 240 and to recognize the image Ycopy as a real image. The training of the discriminator 240 and the image signal processor 230 may be performed alternately multiple times. For example, the discriminator 240 may be trained first 100 times, and then the image signal processor 230 may be trained 100 times, and again the discriminator 240 may be trained 100 times, and then the image signal processor 230 may be trained 100 times. The training operation may be performed repeatedly. As the training operation is repeated, the discriminator 240 may better discriminate between the image Ycopy and the target image Yreal, and the image signal processor 230 may generate the image Ycopy more similar to the target image Yreal. In other words, as the training operation is repeated, the image signal processor 230 may be able to perform an image processing operation to generate the image Ycopy similar to the target image Yreal corresponding to the correct answer, and the image Ycopy may be better analyzed by the computer vision 260 than the image X.

Figure 3:
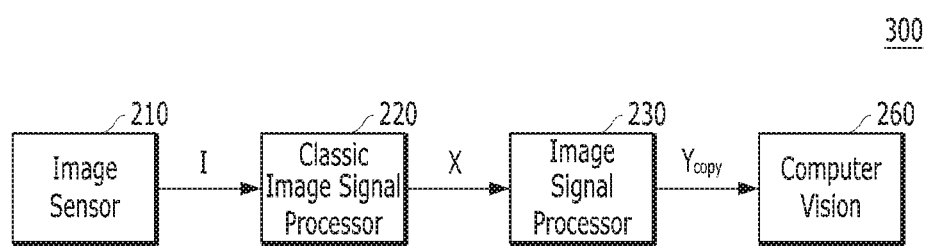
FIG. 3 is a block diagram illustrating an image processing system in accordance with another embodiment of the present invention.

FIG. 3 is a block diagram illustrating an image processing system 300 in accordance with another embodiment of the present invention.

Referring to FIG. 3, the image processing system 300 may include an image sensor 210, a classic image signal processor 220, an image signal processor 230, and a computer vision 260.

In the embodiment of FIG. 3, the discriminator 240 and the target image generator 250 shown in the embodiment of FIG. 2 are omitted. This is because the discriminator 240 and the target image generator 250 are used only for the training (or learning) of the image signal processor 230 and they are not used for the image processing of the image processing system 300. Even though the image processing system 300 is formed as shown in FIG. 3, the image signal processor 230 may have to be trained using the discriminator 240 and the target image generator 250 during the fabrication process.

According to embodiments of the present invention, an image signal processor may improve the performance of computer vision.

While the present invention has been illustrated and described with respect to the specific embodiments, it will be apparent to those skilled in the art that various changes and modifications may be made without departing from the spirit and scope of the invention as defined in the following claims. The invention encompasses all changes and modifications of any of the disclosed embodiments that fall within the scope of the claims.

What is claimed is:

1. An image processing system, comprising:
   an image sensor suitable for generating an input image;
   an image signal processor suitable for processing the input image for analysis by a computer vision component so as to generate a post-processed image; and
   the computer vision component suitable for analyzing the post-processed image,
   wherein the image signal processor includes a first neural network suitable for generating the post-processed image, and
   the first neural network is trained using a discriminator that includes a second neural network, receives a target image and the post-processed image and discriminates between the target image and the post-processed image to recognize the target image as a real image and to recognize the post-processed image as a fake image using the second neural network.

2. The image processing system of claim 1, further comprising:
   a classic image signal processor suitable for enhancing image quality of the input image before the input image is inputted to the image signal processor.

3. The image processing system of claim 1, wherein the second neural network is trained to recognize the target image as the real image and to recognized the post-processed image as the fake image, and
   the first neural network is trained in such a manner that the post-processed image is recognized as the real image by the second neural network.

4. The image processing system of claim 3, wherein the first neural network and the second neural network are alternately trained multiple times.

5. The image processing system of claim 3, wherein the target image is specifically constructed to be analyzed by the computer vision component.

6. A method for training an image processing system, comprising:
   generating, by a first neural network, a post-processed image by processing an input image;
   discriminating, by a second neural network, a target image and the post-processed image to recognize the target image as a real image and to recognize the post-processed image as a fake image to produce a discrimination result; and
   training the first neural network or the second neural network in response to the discrimination result,
   wherein, when the second neural network is trained in the training operation, the second neural network is trained to recognize the target image as the real image and to recognize the post-processed image as the fake image.

7. The method of claim 6, wherein, when the first neural network is trained in the training operation,
   the first neural network is trained such that the post-processed image is recognized as the real image by the second neural network.

8. The method of claim 7, wherein the generating, the discriminating, and the training operations are repeatedly performed multiple times.

* * * * *